United States Patent
Habermas et al.

(10) Patent No.: US 9,343,089 B2
(45) Date of Patent: May 17, 2016

(54) NANOIMPRINT LITHOGRAPHY FOR THIN FILM HEADS

(71) Applicant: Seagate Technology LLC, Cupertino, CA (US)

(72) Inventors: Andrew David Habermas, Bloomington, MN (US); Dongsung Hong, Edina, MN (US); Daniel Boyd Sullivan, Carver, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 13/791,130

(22) Filed: Mar. 8, 2013

(65) Prior Publication Data

US 2014/0254338 A1    Sep. 11, 2014

(51) Int. Cl.
*G11B 5/31* (2006.01)
*B82Y 10/00* (2011.01)

(52) U.S. Cl.
CPC .............. *G11B 5/3163* (2013.01); *G11B 5/314* (2013.01); *G11B 5/3116* (2013.01); *B82Y 10/00* (2013.01); *Y10S 977/887* (2013.01)

(58) Field of Classification Search
None
See application file for complete search history.

(56) References Cited

U.S. PATENT DOCUMENTS

| | | | |
|---|---|---|---|
| 5,682,190 A | 10/1997 | Hirosawa et al. | |
| 6,696,220 B2 * | 2/2004 | Bailey et al. | 425/385 |
| 6,884,551 B2 * | 4/2005 | Fritze | B82Y 10/00 430/311 |
| 7,766,640 B2 * | 8/2010 | Stewart | B82Y 10/00 264/293 |
| 7,805,826 B1 | 10/2010 | Spillane | |
| 8,241,535 B2 * | 8/2012 | Yanagisawa | B29D 11/00875 264/1.27 |
| 2002/0096359 A1 | 7/2002 | Hsu et al. | |
| 2002/0115002 A1 * | 8/2002 | Bailey | B29C 35/0888 430/5 |
| 2004/0189994 A1 | 9/2004 | Sreenivasan et al. | |
| 2004/0257552 A1 | 12/2004 | Hansen | |
| 2005/0186753 A1 | 8/2005 | Chen et al. | |
| 2005/0238965 A1 * | 10/2005 | Tyrrell | B82Y 10/00 430/5 |
| 2005/0250243 A1 * | 11/2005 | Bonnell | B81B 1/00 438/57 |
| 2006/0032437 A1 | 2/2006 | McMackin et al. | |
| 2006/0072090 A1 * | 4/2006 | Bakker | G03F 7/70191 355/53 |
| 2006/0150849 A1 | 7/2006 | Van Santen et al. | |
| 2006/0204865 A1 * | 9/2006 | Erchak | H01L 33/20 430/7 |
| 2006/0221440 A1 * | 10/2006 | Banine | G03F 7/70191 359/359 |
| 2006/0230959 A1 | 10/2006 | Meijer et al. | |

(Continued)

FOREIGN PATENT DOCUMENTS

EP          1837705 A2 *  9/2007  .............. G03F 7/20
JP       2004-286892 A    10/2004

OTHER PUBLICATIONS

Scheer, Hella-Christin Pattern Defintion by Nanoimprint; Proc. SPIE vol. 8428, Micro-Optics 2012, 842802 (Jun. 1, 2012), pp. 1-15.

(Continued)

*Primary Examiner* — Brenda Bernardi
(74) *Attorney, Agent, or Firm* — HolzerIPLaw, PC

(57) ABSTRACT

Nanoimprint lithography can be used in a variety of ways to improve resolution, pattern fidelity and symmetry of microelectronic structures for thin film head manufacturing. For example, write poles, readers, and near-field transducers can be manufactured with tighter tolerances that improve the performance of the microelectronic structures. Further, entire bars of thin film heads can be manufactured simultaneously using nanoimprint lithography, which reduces or eliminated alignment errors between neighboring thin film heads in a bar of thin film heads.

19 Claims, 13 Drawing Sheets

(56) References Cited

U.S. PATENT DOCUMENTS

| | | | |
|---|---|---|---|
| 2006/0266244 A1* | 11/2006 | Kruijt-Stegeman | B41F 1/18 101/485 |
| 2006/0290017 A1 | 12/2006 | Yanagisawa | |
| 2007/0082457 A1 | 4/2007 | Chou et al. | |
| 2007/0138699 A1 | 6/2007 | Wuister et al. | |
| 2007/0159718 A1* | 7/2007 | Kim | G11B 5/02 360/125.03 |
| 2007/0228609 A1 | 10/2007 | Sreenivasan et al. | |
| 2008/0043360 A1* | 2/2008 | Shimazawa | G11B 5/02 360/59 |
| 2008/0264185 A1* | 10/2008 | Kobayashi | B82Y 15/00 73/862.637 |
| 2008/0308971 A1 | 12/2008 | Liu et al. | |
| 2009/0017580 A1 | 1/2009 | Smith | |
| 2010/0077600 A1* | 4/2010 | Seki | G11B 5/3166 29/603.09 |
| 2010/0096256 A1* | 4/2010 | Nalamasu | B82Y 10/00 204/192.34 |
| 2010/0104768 A1* | 4/2010 | Xiao | G11B 5/314 427/552 |
| 2010/0224876 A1 | 9/2010 | Zhu | |
| 2011/0006400 A1 | 1/2011 | Souriau et al. | |
| 2011/0037201 A1* | 2/2011 | Koole | B82Y 10/00 264/447 |
| 2011/0104322 A1 | 5/2011 | Park et al. | |
| 2011/0146568 A1 | 6/2011 | Haukka et al. | |
| 2011/0268869 A1* | 11/2011 | Dijksman | B41J 3/4071 427/8 |
| 2011/0286127 A1* | 11/2011 | Gao | G11B 5/314 360/59 |
| 2012/0061732 A1 | 3/2012 | Hirai et al. | |
| 2012/0112385 A1* | 5/2012 | Sreenivasan | B82Y 10/00 264/293 |
| 2012/0300202 A1* | 11/2012 | Fattal | G01N 21/658 356/301 |
| 2013/0214452 A1* | 8/2013 | Choi | B29C 59/026 264/293 |
| 2014/0154471 A1* | 6/2014 | Kodama | C08F 222/1006 428/156 |

OTHER PUBLICATIONS

Malloy, Matt and Litt, Lloyd Technology Review and Assessment of Nanoimprint Lithography for Semiconductor and Patterned Media Manufacturing; Journal of Micro/Nanolithography, MEMS, and MOEMS, Jul.-Sep. 2001/vol. 10, pp. 1-14.

International Search Report and Written Opinion of PCT/US2014/0139801 mailed May 20, 2014, 10 pages.

* cited by examiner

2

NANOIMPRINT LITHOGRAPHY FOR THIN FILM HEADS

BACKGROUND

Photolithography (also "optical lithography" or "UV lithography") is a process used in semiconductor micro-fabrication to pattern parts of a thin film wafer or other substrate. It uses light to transfer a geometric pattern from a photomask (also "mask") to a light-sensitive chemical "photoresist" (also "resist") on the substrate. The ability to project a clear image of small features onto the substrate is limited by the wavelength of the light that is used and the ability of a reduction lens system to capture enough diffraction orders from the illuminated mask. Current state-of-the-art photolithography tools use deep ultraviolet (DUV) light from excimer lasers with wavelengths of about 248 and 193 nm, which allow minimum feature sizes down to about 40 nm. A desire to achieve extremely small features on the wafer with high resolution has resulted in extremely large reduction lens systems, which are expensive and unwieldy.

Electron beam lithography (also "e-beam lithography") is another process used in semiconductor micro-fabrication to pattern parts of a substrate. E-beam lithography emits a beam of electrons in a patterned fashion across the substrate covered with resist to selectively expose the resist. As such, e-beam lithography does not utilize a photomask to create a pattern and is therefore is not limited by the diffraction limit of the exposing light penetrating though the photomask. As a result, e-beam lithography does not require the extremely large reduction lens systems utilized in optical lithography. However, e-beam lithography typically requires a long exposure time and is thus limited in its throughput capability, which renders e-beam lithography not cost effective for many manufacturing processes. Further, e-beam exposure can be problematic when directly patterning on magnetic films because of undesirable interactions between the electron charges and the magnetic film.

SUMMARY

Implementations described and claimed herein address the foregoing problems by a magnetic thin film head comprising one or more microelectronic structures patterned using nanoimprint lithography.

Other implementations are also described and recited herein.

BRIEF DESCRIPTIONS OF THE DRAWINGS

DETAILED DESCRIPTIONS

Nanoimprint lithography (or hot embossing) is a method of fabricating nanometer scale structures on a substrate without the use of the extremely large reduction lens systems in photolithography and with higher throughput than e-beam lithography. Nanoimprint lithography can be used to generate low cost, high throughput, and high resolution nanometer scale structures.

Further, heat-assisted magnetic recording (or "HAMR") is a technology that magnetically records data on high-stability media using thermal assistance to first heat the media. By temporarily and locally heating the media above the Curie temperature, the media coercivity drops substantially and a realistically achievable magnetic write field can write data to the locally heated portion of the media. As a result, HAMR media may utilize high-stability magnetic compounds such as iron platinum alloy. These materials can store single bits of data in a much smaller area without being limited by the same superparamagnetic effect that limits conventional magnetic recording media.

In one implementation, one or more near-field transducers (NFTs) are used to heat the media, as discussed above. The NFTs function by accurately focusing plasmonic waves onto a desired location on the media, which locally heats the media. Nanoimprint lithography is disclosed herein to manufacture NFTs, and other thin film microelectronic structures (e.g., readers, and writers) with accurate, precise, and repeatable dimensions not previously achievable and/or cost effective using conventional techniques (e.g., optical lithography and e-beam lithography).

A magnetic thin film head is referred to herein as a thin film head including one or more magnetic layers. Further, nanoimprint lithography may be used to manufacture one or more of the layers within the magnetic thin film head, including magnetic and non-magnetic layers.

Figure 1:
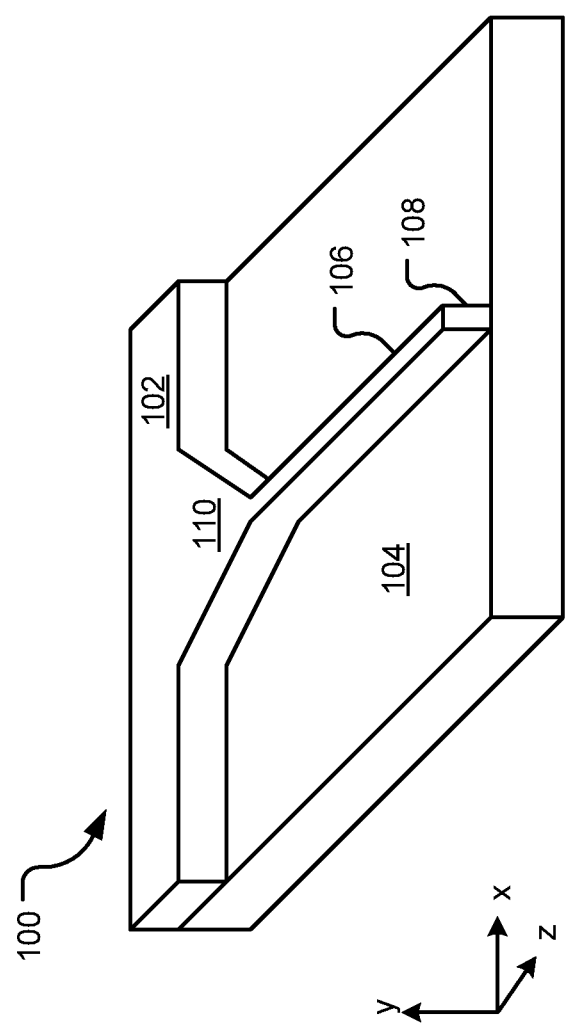
FIG. 1 illustrates a perspective view of an example near-field transducer patterned on a substrate using nanoimprint lithography.

FIG. 1 illustrates a perspective view of an example near-field transducer 100 patterned on a substrate 104 using nanoimprint lithography. The substrate 104 is an amorphous ceramic wafer (e.g., an AlTiC wafer) and includes a planar surface oriented generally in the x-z plane. The substrate 104 may extend substantially further in the x-z plane than that shown in FIG. 1.

The NFT 100 is patterned onto the substrate 104 as a thin-film using nanoimprint lithography as discussed in detail below with reference to FIGS. 8-11. The NFT 100 includes a body portion 102, a transition portion 110, and a peg portion 106 and utilizes an electric signal to generate and focus plasmonic waves onto a media (not shown). The plasmonic waves are emitted from the peg portion 106 at an air bearing surface 108 of the NFT 100. The dimensions of the NFT 100 define its performance for generating and focusing plasmonic waves onto a media. Fine-tuning the NFT 100 dimensions (as discussed in detail with regard to FIGS. 2-7) is made possible using the presently disclosed nanoimprint lithography technology. The NFT 100 dimensions are defined by a template (not shown, see nanoimprint lithography template 918 of FIG. 9) and are characterized using the following dimensional terms.

Pattern fidelity refers to the precision and accuracy at which the disclosed NIL technique produces a singular NFT (or other thin film microelectronic structure) using a corresponding template. More specifically, pattern fidelity includes symmetry about one or more axes, achievable flare angle of the NFT pattern, flare angle precision, and achievable corner rounding precision. Pattern fidelity may also include NFT shape and edge placement control. Edge placement error refers to edge placement error as compared to a design or pattern shape. Variations in pattern fidelity significantly impact the NFT's performance in generating and focusing plasmonic waves onto a media. Pattern fidelity is discussed in more detail with reference to FIGS. 2-7 below.

A critical dimension is referred to herein as a dimension of an NFT (or other thin film microelectronic structure) that is particularly important to NFT performance. Often, the critical dimension is the smallest linear dimension of the NFT, but not always. Resolution refers to the minimum dimension of the NFT that can be accurately reproduced on a substrate (e.g., a width of peg portion 106). Line edge roughness refers to NFT edge roughness or variations (e.g., variation in the boundaries of the peg portion 106). Resolution and line edge roughness are discussed in more detail with reference to FIGS. 2-7 below.

Colinearity refers to the accuracy and precision at which the disclosed NIL technique places NFTs (or other thin film microelectronic structures) across a bar of NFTs using a corresponding template. Any deviation of the placement of individual NFTs in a bar of NFTs impacts peg length, STRIPE ("STRP") height, and break point definition and control. Critical dimension uniformity refers to the accuracy and precision at which the disclosed NIL technique reproduces a critical dimension of each NFT (or other thin film microelectronic structures) across the bar of NFTs. Colinearity and critical dimension uniformity are discussed in more detail with reference to FIG. 8 below.

Figure 2:
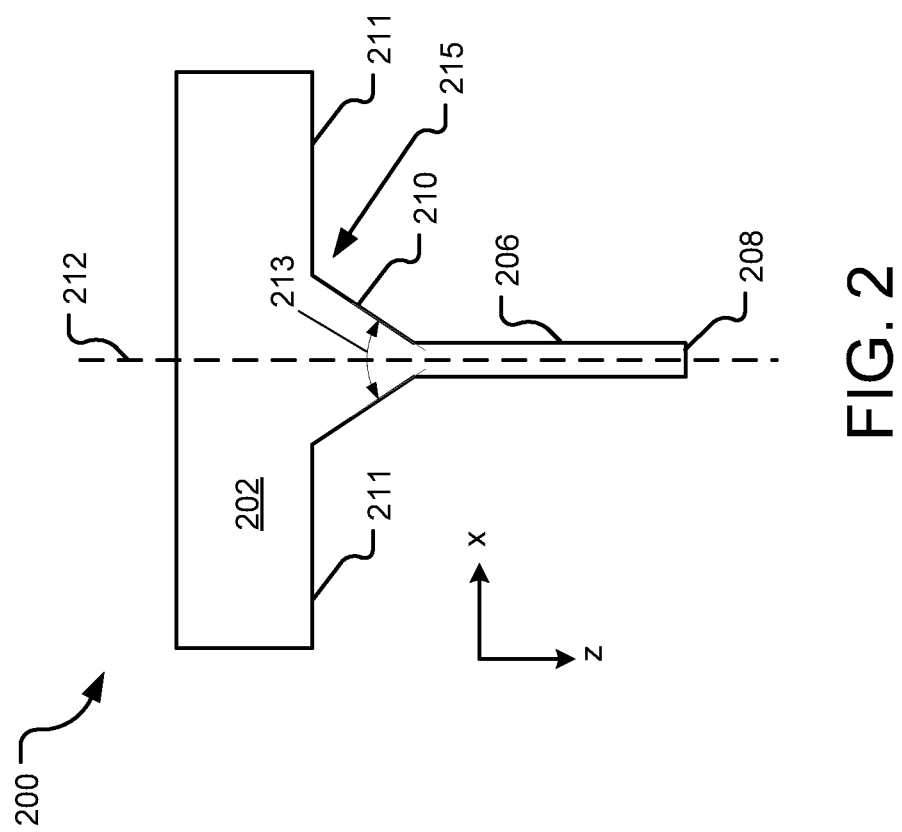
FIG. 2 illustrates a plan view of a first example near-field transducer patterned using nanoimprint lithography.

FIG. 2 illustrates a plan view of a first example near-field transducer 200 patterned using nanoimprint lithography. The NFT 200 is patterned onto a substrate (not shown) as a thin-film using nanoimprint lithography as discussed in detail below with reference to FIGS. 9-12. The NFT 200 includes a body portion 202, a transition portion 210, and a peg portion 206 and utilizes an electric signal to generate and focus plasmonic waves onto a media (not shown). The plasmonic waves are emitted from the peg portion 206 at an air bearing surface 208 of the NFT 200. In other implementations, FIG. 2 illustrates a reader for a thin-film head. Nanoimprint lithography allows the near-field transducer 200 to be patterned with a very high and repeatable pattern fidelity and resolution, while minimizing edge roughness, which yields a NFT 200 with improved performance.

Optical lithography typically utilizes a chemically amplified resist, where active chemical components of the resist may diffuse into adjacent regions. This limits the repeatable pattern fidelity and resolution and is a source of edge roughness. Nanoimprint lithography may utilize a non-chemically amplified resist, which does not have the same diffusion mechanisms as chemically amplified resist, which improves repeatable pattern fidelity and resolution, while minimizing edge roughness. Further, the light diffraction limit typically limits the pattern fidelity and edge roughness in optical lithography techniques, which is not limiting in the presently disclosed NIL techniques.

A high level of precision and accuracy is achieved in producing the NFT 200 (collectively a high pattern fidelity). More specifically, the taper of the transition portion 210 may be linear (as depicted in FIG. 2), or convex or concave with a desired radius of curvature (e.g., a 100-200 nm radius with an edge placement error less than about 5 nm). Further, patterning the corners (e.g., corner 215) may be achieved with a radius of curvature of about 100 nm. Also, the relative size of the transition portion 210 may vary, which may be defined by the angle of the transition portion 210, or flare angle (e.g., angle 213 may range from 50-90 degrees with repeatable precision within 2-3 degrees), width in the x-direction at an interface (e.g., 150-300 nm) with the body portion 202 and/or overall length of the transition portion 210 in the z-direction (e.g., 75-321 nm).

Further, a high level of resolution with low line edge roughness is achieved in producing the NFT 200. More specifically, the specific shape of the NFT 200 may be fine tuned to achieve desired performance characteristics. For example, a width of the peg portion 206 in the x-direction may be 30 nm (or 10-100 nm) within a 2 nm margin. Further, a length of the peg portion 206 in the z-direction (e.g., in the negative z-direction from edges 211) may be 25 nm (or 10-100 nm), within a 7 nm margin of error. Further, line edge roughness of the NFT 200 is maintained within less than about 3 nm, and in some implementations less than about 2 nm. In conventional techniques, the pattern fidelity of the NFT 200 of the peg portion 206 may vary, resulting in necking of the peg portion 206 and poor NFT performance.

Still further, x-z plane symmetry about axis 212, which runs generally in the z-direction, may be important to maximize the performance characteristics of the NFT 200. In one implementation, the edge symmetry about axis 212 (e.g., symmetry of edges 211 about the axis 212) is maintained to less than about a 20 nm deviation, which maximizes the performance of the selected NFT design. In other implementations, the symmetry about axis 212 is maintained to less than about a 5 nm deviation. In yet other implementations, an intentional deviation from the symmetry about the axis 212 is introduced to achieve a desired performance characteristic.

Figure 3:
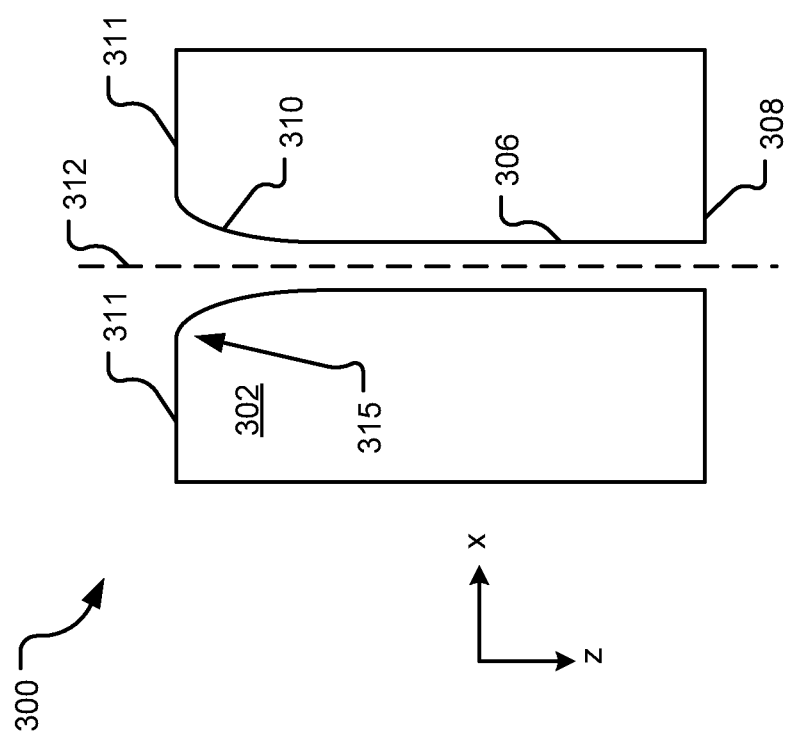
FIG. 3 illustrates a plan view of a second example near-field transducer patterned using nanoimprint lithography.

FIG. 3 illustrates a plan view of a second example near-field transducer 300 patterned using nanoimprint lithography. The NFT 300 is patterned onto a substrate (not shown) as a thin-film using nanoimprint lithography as discussed in detail below with reference to FIGS. 9-12. The NFT 300 includes a body portion 302 surrounding a gap 306 and utilizes an electric signal to generate and focus plasmonic waves onto a media (not shown). The plasmonic waves are emitted from the gap 306 at an air bearing surface 308 of the NFT 300. In one implementation, the near-field transducer 300 depicts the same or a similar gap plasmon transducer as near field transducer 200 of FIG. 2, but illustrated with the opposite polarity.

A high level of precision and accuracy is achieved in producing the NFT 300 (collectively a high pattern fidelity). More specifically, tapering 310 of the gap 306 may be convex (as depicted in FIG. 3), linear, or concave with a desired radius of curvature (e.g., a 100-200 nm radius with an edge placement error less than about 5 nm). In one implementation, the tapering 310 of the gap 306 has a radius of curvature less than about 20 nm with precise location control (e.g., less than about 5 nm error). In another implementation, the tapering 310 of the gap 306 has a radius of curvature between 20-100 nm with precise location control (e.g., less than about 5 nm error). Further, patterning the corners (e.g., corner 315) may be achieved with a radius of curvature of about 100 nm. Still further, the relative size of the tapering portion 310 may vary.

Further, a high level of resolution with low edge roughness is achieved in producing the NFT 300. More specifically, the specific shape of the NFT 300 may be fine tuned to achieve desired performance characteristics. For example, a width of the peg portion 306 in the x-direction may be 30 nm (or 10-100 nm) within a 2 nm margin. Further, a length of the peg portion 306 in the z-direction (e.g., in the negative z-direction from edges 311) may be 25 nm (or 10-100 nm), within a 7 nm margin of error. Further, edge roughness of the NFT 300 is maintained within less than about 3 nm, and in some implementations less than about 2 nm. In conventional techniques, the pattern fidelity of the NFT 300 of the peg portion 306 may vary, resulting in necking of the peg portion 306 and poor NFT performance.

Still further, x-z plane symmetry about axis 312, which runs generally in the z-direction, may be important to maximize the performance characteristics of the NFT 300. In one implementation, the edge symmetry about axis 312 (e.g., symmetry of edges 311 about the axis 312) is maintained to less than about a 20 nm deviation, which maximizes the performance of the selected NFT design. In other implementations, the symmetry about axis 312 is maintained to less than about a 5 nm deviation. In yet other implementations, an intentional deviation from the symmetry about the axis 312 is introduced to achieve a desired performance characteristic.

Figure 4:
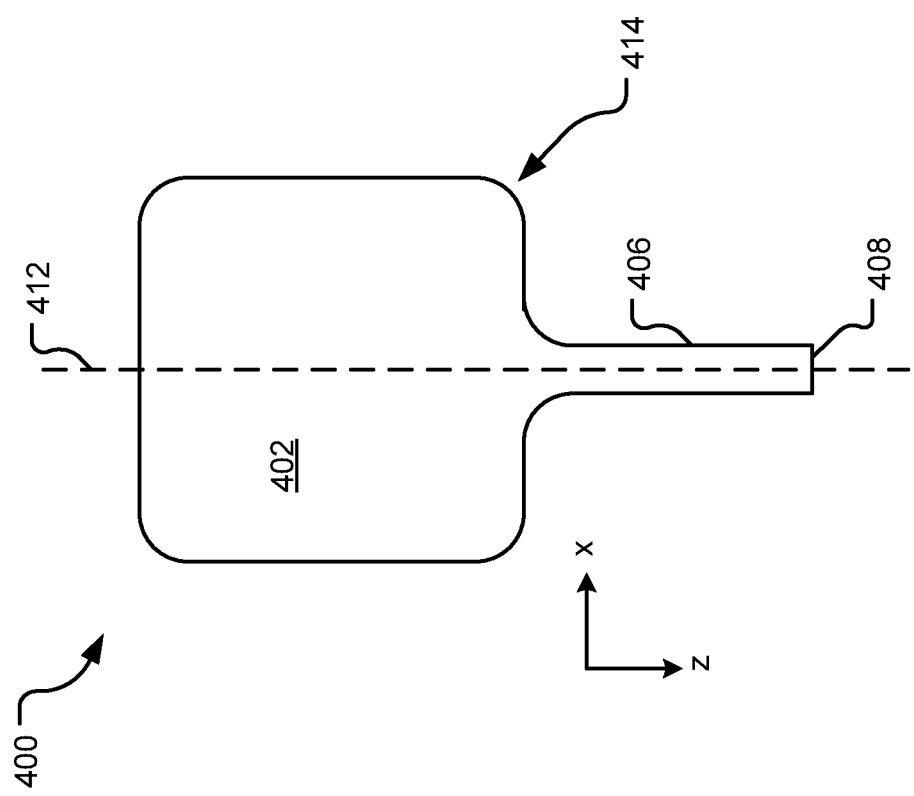
FIG. 4 illustrates a plan view of a third example near-field transducer patterned using nanoimprint lithography.

FIG. 4 illustrates a plan view of a third example near-field transducer 400 patterned using nanoimprint lithography. The NFT 400 is patterned onto a substrate (not shown) as a thin-film using nanoimprint lithography as discussed in detail below with reference to FIGS. 9-12. The NFT 400 includes a body portion 402 and a peg portion 406 and utilizes an electric signal to generate and focus plasmonic waves onto a media (not shown). The plasmonic waves are emitted from the peg portion 406 at an air bearing surface 408 of the NFT 400.

A high level of precision and accuracy is achieved in producing the NFT 400 (collectively a high pattern fidelity). More specifically, a high level of resolution with low edge roughness is achieved in producing the NFT 400. More specifically, the specific shape of the NFT 400 may be fine tuned to achieve desired performance characteristics. For example, a width in the x-direction and a length in the z-direction of the peg portion 406 may each range from 10-100 nm, within a 7 nm margin of error for length and a 2 nm margin of error for width. Still further, a width in the x-direction and a length in the z-direction of the body portion 402 may each range from 150-500 nm, within a 7 nm margin of error. Further yet, corners of the body portion (e.g., corner 414) may have a desired radius of curvature (e.g., 5-50 nm radius with precise location control (e.g., less than about 5 nm error). Further still, edge roughness of the NFT 400 is maintained within less than about 3 nm, and in some implementations less than about 2 nm. In conventional techniques, the pattern fidelity of the NFT 400 of the peg portion 406 may vary, resulting in necking of the peg portion 406 and poor NFT performance.

Further, x-z plane symmetry about axis 412, which runs generally in the z-direction, may be important to maximize the performance characteristics of the NFT 400. In one implementation, NFT 400 symmetry about axis 412 is maintained to less than about a 20 nm deviation, which maximizes the performance of the selected NFT design. In other implementations, the symmetry about axis 412 is maintained to less than about a 5 nm deviation. In yet other implementations, an intentional deviation from the symmetry about the axis 412 is introduced to achieve a desired performance characteristic.

Figure 5:
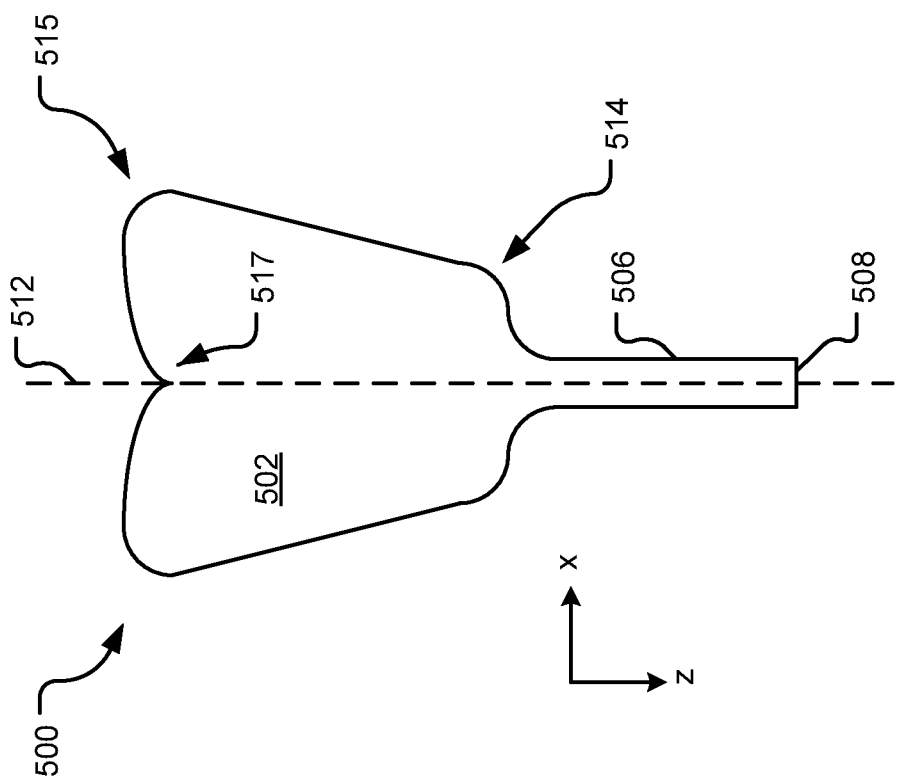
FIG. 5 illustrates a plan view of a fourth example near-field transducer patterned using nanoimprint lithography.

FIG. 5 illustrates a plan view of a fourth example near-field transducer 500 patterned using nanoimprint lithography. The NFT 500 is patterned onto a substrate (not shown) as a thin-film using nanoimprint lithography as discussed in detail below with reference to FIGS. 9-12. The NFT 500 includes a body portion 502 and a peg portion 506 and utilizes an electric signal to generate and focus plasmonic waves onto a media (not shown). The plasmonic waves are emitted from the peg portion 506 at an air bearing surface 508 of the NFT 500.

A high level of precision and accuracy is achieved in producing the NFT 500 (collectively a high pattern fidelity). More specifically, a high level of resolution with low edge roughness is achieved in producing the NFT 500. More specifically, the specific shape of the NFT 500 may be fine tuned to achieve desired performance characteristics. For example, a width in the x-direction and a length in the z-direction of the peg portion 506 may each range from 10-100 nm, within a 7 nm margin of error for length and a 2 nm margin of error for width. Still further, a width in the x-direction and a length in the z-direction of the body portion 502 may each range from 150-500 nm, within a 7 nm margin of error. Further yet, lower corners of the body portion (e.g., corner 515) may have a desired radius of curvature (e.g., 5-50 nm radius with precise location control (e.g., less than about 5 nm error)). Further still, upper corners of the body portion (e.g., corner 515) may have a desired radius of curvature (e.g., 5-50 nm radius with precise location control (e.g., less than about 5 nm error)). The body portion 502 further has an inverted peak 517 with a desired radius of curvature (e.g., 5-50 nm radius with precise location control (e.g., less than about 5 nm error)). Further still, edge roughness of the NFT 500 is maintained within less than about 3 nm, and in some implementations less than about 2 nm. In conventional techniques, the pattern fidelity of the NFT 500 of the peg portion 506 may vary, resulting in necking of the peg portion 506 and poor NFT performance.

Further, x-z plane symmetry about axis 512, which runs generally in the z-direction, may be important to maximize the performance characteristics of the NFT 500. In one implementation, NFT 500 symmetry about axis 512 is maintained to less than about a 20 nm deviation, which maximizes the performance of the selected NFT design. In other implementations, the symmetry about axis 512 is maintained to less than about a 5 nm deviation. In yet other implementations, an intentional deviation from the symmetry about the axis 512 is introduced to achieve a desired performance characteristic.

Figure 6:
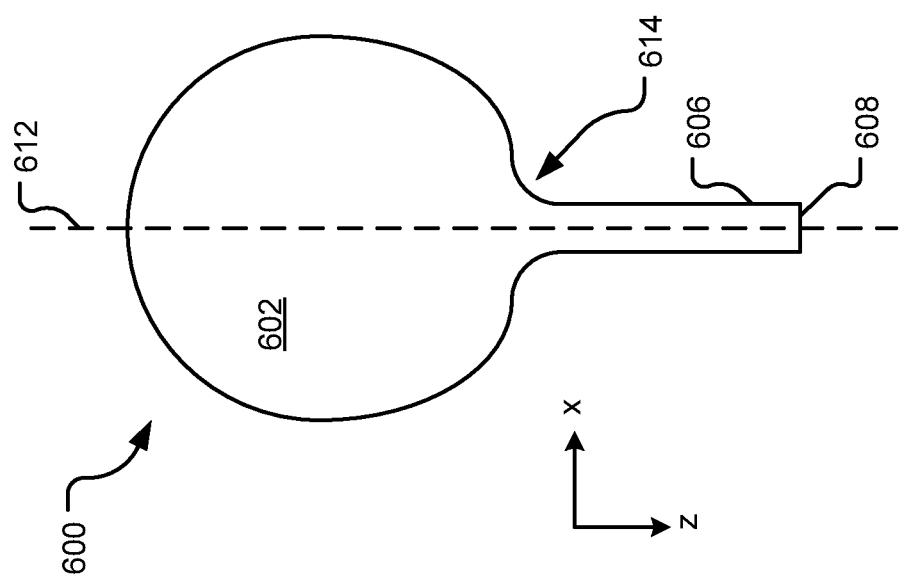
FIG. 6 illustrates a plan view of a fifth example near-field transducer patterned using nanoimprint lithography.

FIG. 6 illustrates a plan view of a fifth example near-field transducer 600 patterned using nanoimprint lithography. The NFT 600 is patterned onto a substrate (not shown) as a thin-film using nanoimprint lithography as discussed in detail below with reference to FIGS. 9-12. The NFT 600 includes a body portion 602 and a peg portion 606 and utilizes an electric signal to generate and focus plasmonic waves onto a media (not shown). The plasmonic waves are emitted from the peg portion 606 at an air bearing surface 608 of the NFT 600.

A high level of precision and accuracy is achieved in producing the NFT 600 (collectively a high pattern fidelity). More specifically, a high level of resolution with low edge roughness is achieved in producing the NFT 600. More specifically, the specific shape of the NFT 600 may be fine tuned to achieve desired performance characteristics. For example, a width in the x-direction and a length in the z-direction of the peg portion 606 may each range from 10-100 nm, within a 7 nm margin of error for length and a 2 nm margin of error for width. Still further, a width in the x-direction and a length in the z-direction of the body portion 602 may each range from 150-500 nm, within a 7 nm margin of error. Further yet, corners of the body portion (e.g., corner 614) may have a desired radius of curvature (e.g., 5-50 nm radius with precise location control (e.g., less than about 5 nm error)). Further still, edge roughness of the NFT 600 is maintained within less than about 3 nm, and in some implementations less than about 2 nm. In conventional techniques, the pattern fidelity of the NFT 600 of the peg portion 606 may vary, resulting in necking of the peg portion 606 and poor NFT performance.

Further, x-z plane symmetry about axis 612, which runs generally in the z-direction, may be important to maximize the performance characteristics of the NFT 600. In one implementation, NFT 600 symmetry about axis 612 is maintained to less than about a 20 nm deviation, which maximizes the performance of the selected NFT design. In other implementations, the symmetry about axis 612 is maintained to less than about a 5 nm deviation. In yet other implementations, an intentional deviation from the symmetry about the axis 612 is introduced to achieve a desired performance characteristic.

Figure 7:
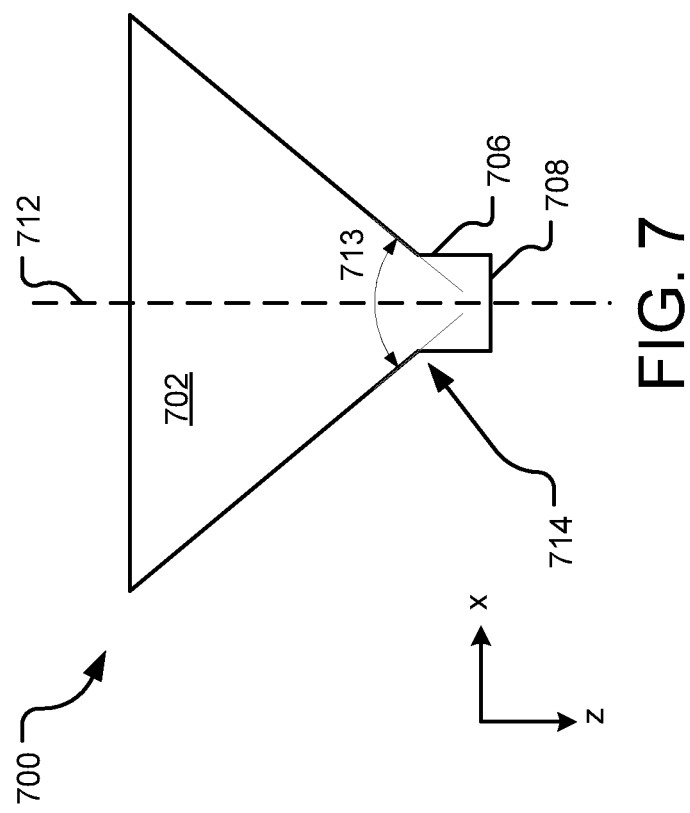
FIG. 7 illustrates a plan view of an example perpendicular write pole patterned using nanoimprint lithography.

FIG. 7 illustrates a plan view of an example perpendicular write pole 700 patterned using nanoimprint lithography. The write pole 700 is patterned onto a substrate (not shown) as a thin-film using nanoimprint lithography as discussed in detail below with reference to FIGS. 9-12. The write pole 700 includes a body portion 702 and a pole portion 706 and utilizes an electric signal to generate a magnetic field that interacts with magnetic domains on a media. The magnetic field is emitted from the pole portion 706 at an air bearing surface 708 of the write pole 700 and serves to selectively switch the polarity of the individual magnetic domains.

A high level of precision and accuracy is achieved in producing the write pole 700 (collectively a high pattern fidelity). More specifically, a high level of resolution with low edge roughness is achieved in producing the write pole 700. Further, the specific shape of the write pole 700 may be fine tuned to achieve desired performance characteristics. For example, a width in the x-direction and a length in the z-direction of the pole portion 706 may each range from 10-100 nm, within a 7 nm margin of error for length and a 2 nm margin of error for width. Further, the relative size and shape of the body portion 702 may vary, which may be defined by the length in the z-direction and width in the x-direction (e.g., 200 nm×20 nm) and angle (e.g., angle 713, which may range from 60-90 degrees) of the body portion 702.

Further, patterning the corners (e.g., corner 714) may be achieved with a maximum radius of curvature of about 100-200 nm with an edge placement error of less than about 5 nm. Further still, edge roughness of the write pole 700 is maintained within less than about 3 nm, and in some implementations less than about 2 nm.

Further, x-z plane symmetry about axis 712, which runs generally in the z-direction, may be important to maximize the performance characteristics of the write pole 700. In one implementation, write pole 700 symmetry about axis 712 is maintained to less than about a 20 nm deviation, which maximizes the performance of the selected write pole design. In other implementations, the symmetry about axis 712 is maintained to less than about a 5 nm deviation. In yet other implementations, an intentional deviation from the symmetry about the axis 712 is introduced to achieve a desired performance characteristic.

Figure 8:
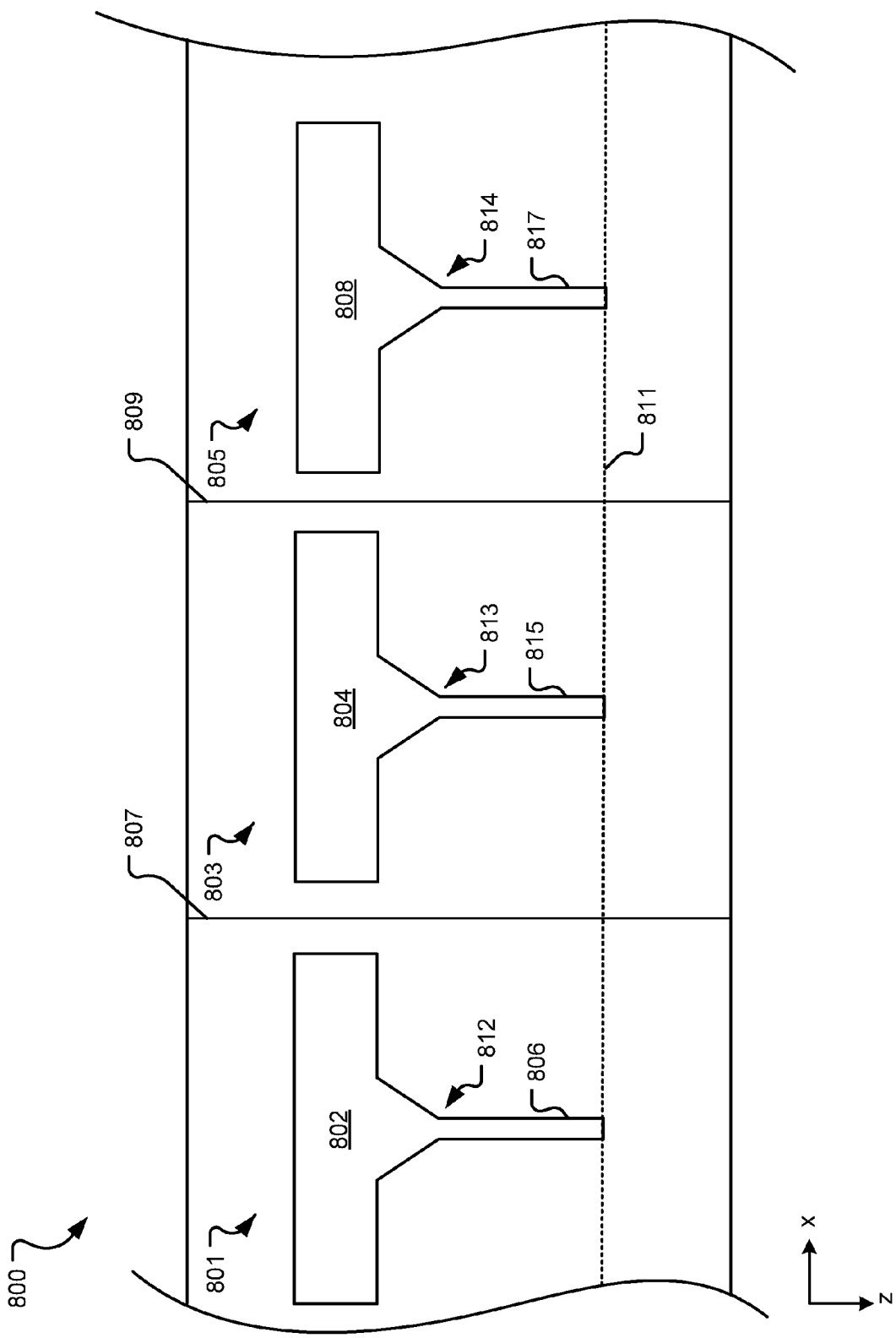
FIG. 8 illustrates a plan view of an example bar of near-field transducers patterned using nanoimprint lithography.

FIG. 8 illustrates a plan view of an example bar 800 of near-field transducers (e.g., NFT 801, NFT 803, and NFT 805) patterned using nanoimprint lithography. For example, thin film heads or NFTs may be manufactured in groups referred to as bars (e.g., bar 800) containing a predetermined number of thin film heads (e.g., 50-100 heads, often 64 heads) in a row. Each individual head or NFT may be separated by scribe lines (e.g., scribe lines 807, 809) that define where the bar 800 is diced into individual heads or NFTs.

Nanoimprint lithography may be used to manufacture a singular microelectronic structure (see e.g., FIGS. 2-7), a bar of microelectronic structures extending along an axis (e.g., bar 800 extending in positive and negative x-directions) or an array of microelectronic structures (e.g., multiple bars extending in the x-direction adjacent one another in the z-direction, not shown). An entire bar or array of thin film heads may be patterned simultaneously without the need to stitch together individual thin film heads using a step-and-repeat process such as that often used in optical lithography. As a result, colinearity of the bar or array of thin film heads is greatly improved.

More specifically, colinearity refers to the accuracy and precision at which the disclosed NIL technique places NFTs (or other thin film microelectronic structures) across a bar of NFTs using a corresponding NIL template. Any deviation of the placement of individual NFTs in a bar of NFTs impacts peg length, STRP height, and break point definition and control. For example, variations in placement of individual NFTs in the z-direction relative to a break line 811 affects peg portion length.

NFT 801 includes a body portion 802 and a peg portion 806. NFT 803 includes a body portion 804 and a peg portion 815. NFT 805 includes a body portion 808 and a peg portion 817. A length of each of the peg portions 806, 815, 817 is defined as the z-direction distance between the break line 811 and corresponding first vertices (i.e., vertices 812, 813, 814) where each peg portions 806, 815, 817 (label first vertex) merge into the each of the body portions 802, 804, 808 of each of the NFTs 801, 803, 805. Variations in peg lengths are referred to herein as colinearity errors. In various implementations, these errors are maintained at less than 5 nm or 2 nm.

Further, any variations in spacing between affects individual NFT placement relative to the scribe lines. In one implementation, this x-direction spacing error is maintained at less than 2 nm. Still further, rotation of individual NFTs in the x-z plane may also affect individual NFT performance. In one implementation, this rotation error is maintained at less than 0.01 microradians.

Further, critical dimension uniformity refers to the accuracy and precision at which the disclosed NIL technique reproduces a critical dimension of each NFT 801, 803, 805 across the bar 800 of NFTs. In one implementation, critical dimension uniformity is maintained to less than 2 nm variations. In other implementations, critical dimension uniformity is maintained at less than 1 nm, when measured within a single bar since the entire bar can be patterned by a single imprint field.

Figure 9:
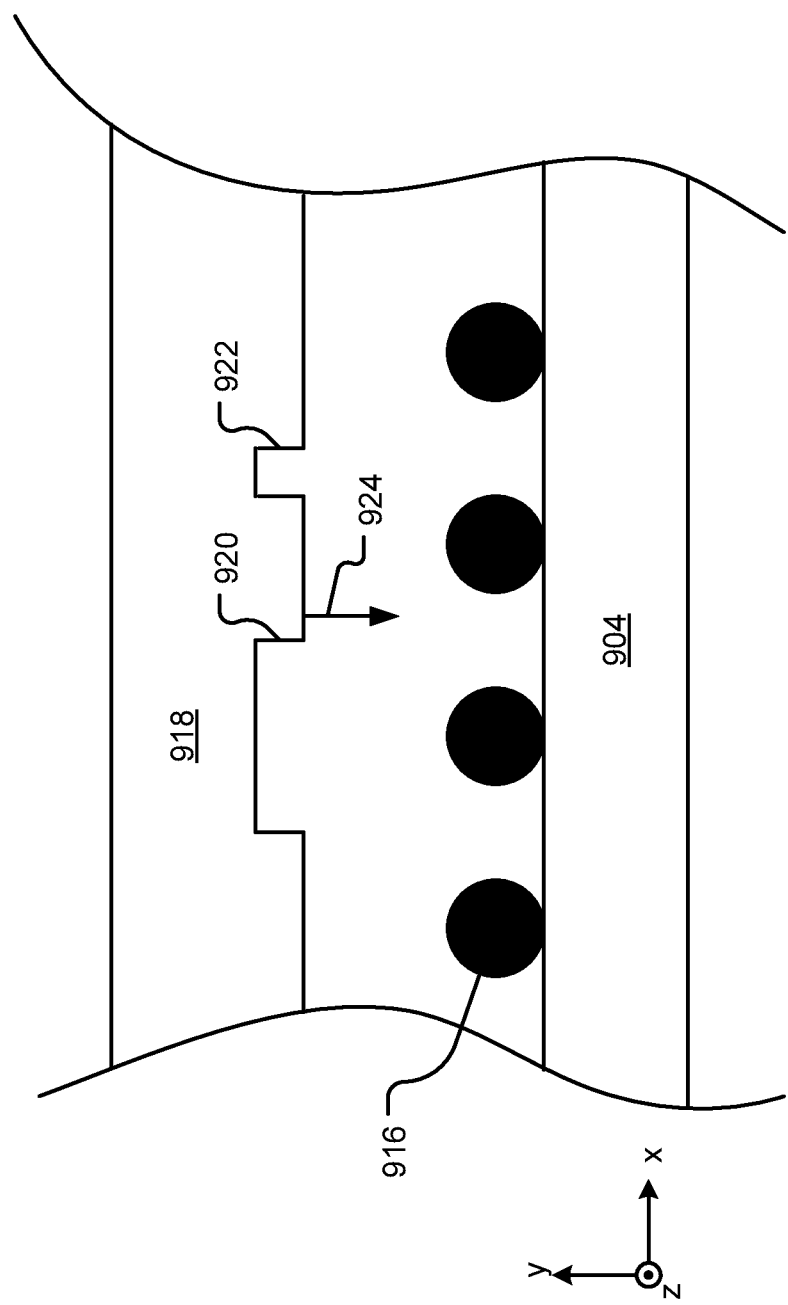
FIG. 9 illustrates an elevation view of an example substrate with droplets of photoresist deposited thereon and a nanoimprint lithography template positioned over the substrate.

FIG. 9 illustrates an elevation view of an example substrate 904 with droplets of photoresist (e.g., droplet 916) deposited thereon and a nanoimprint lithography template 918 positioned over the substrate 904. The substrate 904 is a ceramic wafer (e.g., an AlTiC wafer) that includes a planar surface oriented generally in the x-z plane. The substrate 904 may extend substantially further in the x-z plane than that shown in FIG. 9.

The droplets of photoresist are liquid and injected onto the substrate 904 in an array of droplets. Further, the droplets may be concentrated specifically where they are to be patterned onto the substrate 904. The template 918 includes features (e.g., features 920, 922) to be reproduced onto the substrate 904. Each of the features 920, 922 has particular dimensions (e.g., height (e.g., in the y-direction), width (e.g., in the x-direction), and length (e.g., in the z-direction) that correspond to the dimensions of a feature to be reproduced onto the substrate 904.

The template 918 is aligned with the substrate 904 via alignment marks (not shown) and lowered toward the substrate 904 generally in the negative y-direction, as illustrated by arrow 924.

Figure 10:
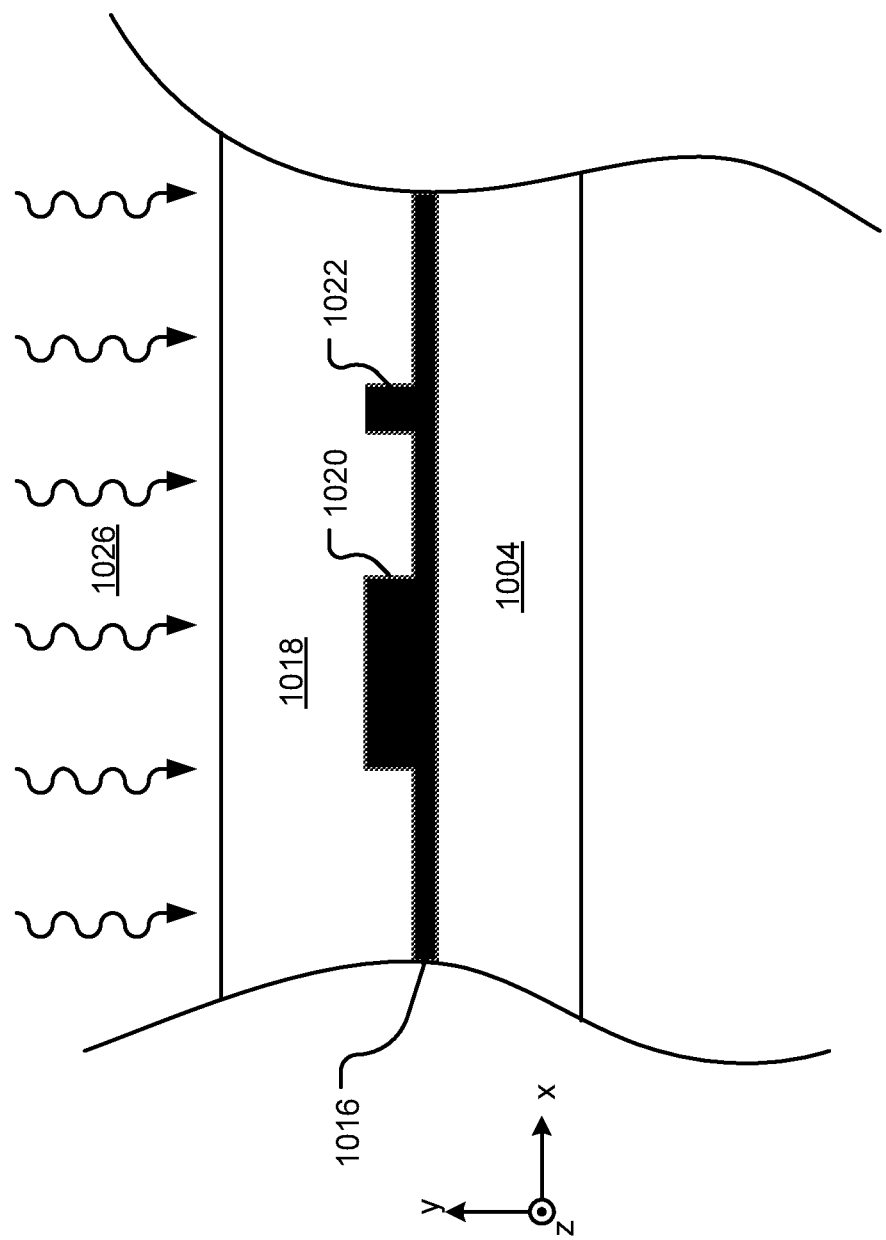
FIG. 10 illustrates an elevation view of a nanoimprint lithography template brought in close proximity to an example substrate with photoresist occupying space between the template and the substrate.

FIG. 10 illustrates an elevation view of a nanoimprint lithography template 1018 brought in close proximity to an example substrate 1004 with photoresist 1016 occupying space between the template 1018 and the substrate 1004. The template 1018 is brought in close proximity to the substrate 1004 without actually touching the substrate 1004. The liquid resist 1016, which was depicted as droplets (e.g., droplet 916) in FIG. 9, occupies features (e.g., features 1020, 1022) to be reproduced onto the substrate 1004. Mechanical deformation and capillary action allows the liquid resist 1016 to fully occupy the template 1018 pattern.

The imprint resist is then cured by heat or UV light, as illustrated by wavy arrows 1026. The curing light solidifies the resist 1016 in the shape of the template 1018 pattern on the substrate 1004.

Figure 11:
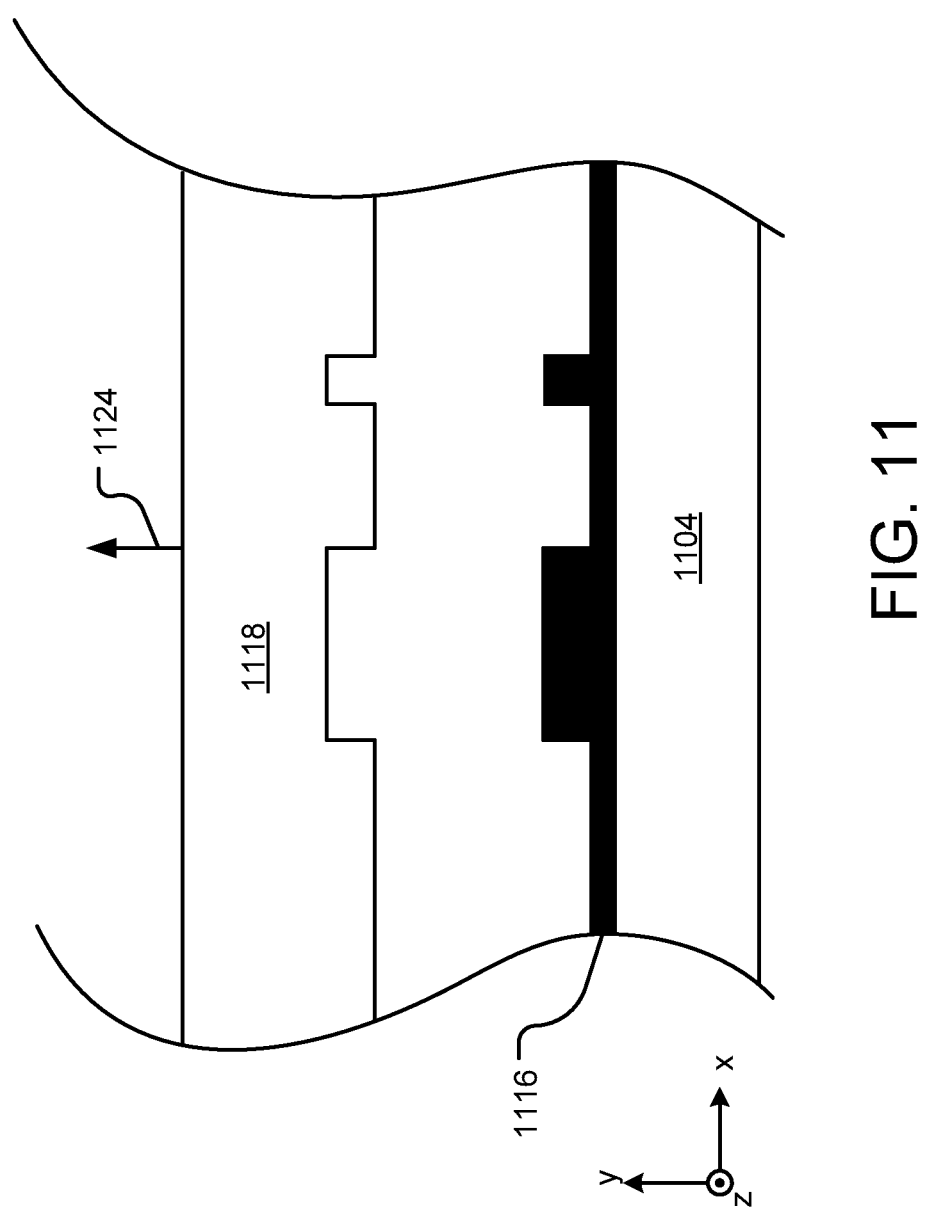
FIG. 11 illustrates an elevation view of a nanoimprint lithography template removed from an example substrate with cured photoresist remaining on the substrate in the shape of the removed template pattern.

FIG. 11 illustrates an elevation view of a nanoimprint lithography template 1118 removed from an example substrate 1104 with a cured photoresist layer 1116 remaining on the substrate 1104 in the shape of the removed template 1118 pattern. The template 1118 is pulled away from the substrate 1104 generally in the y-direction, as illustrated by arrow 1124. The template 1118 separates from the cured photoresist layer 1116 while the photoresist layer 1116 remains attached to the substrate 1104. This is accomplished by selecting the material and surface properties of the template 1118 and substrate 1104 so that the template 1118 has less adhesion to the photoresist layer 1116 than the substrate 1104. In some implementations, a coating or separation layer (not shown) is provided on the template 1118 to promote separation of the template 1118 from the photoresist layer 1116.

Figure 12:
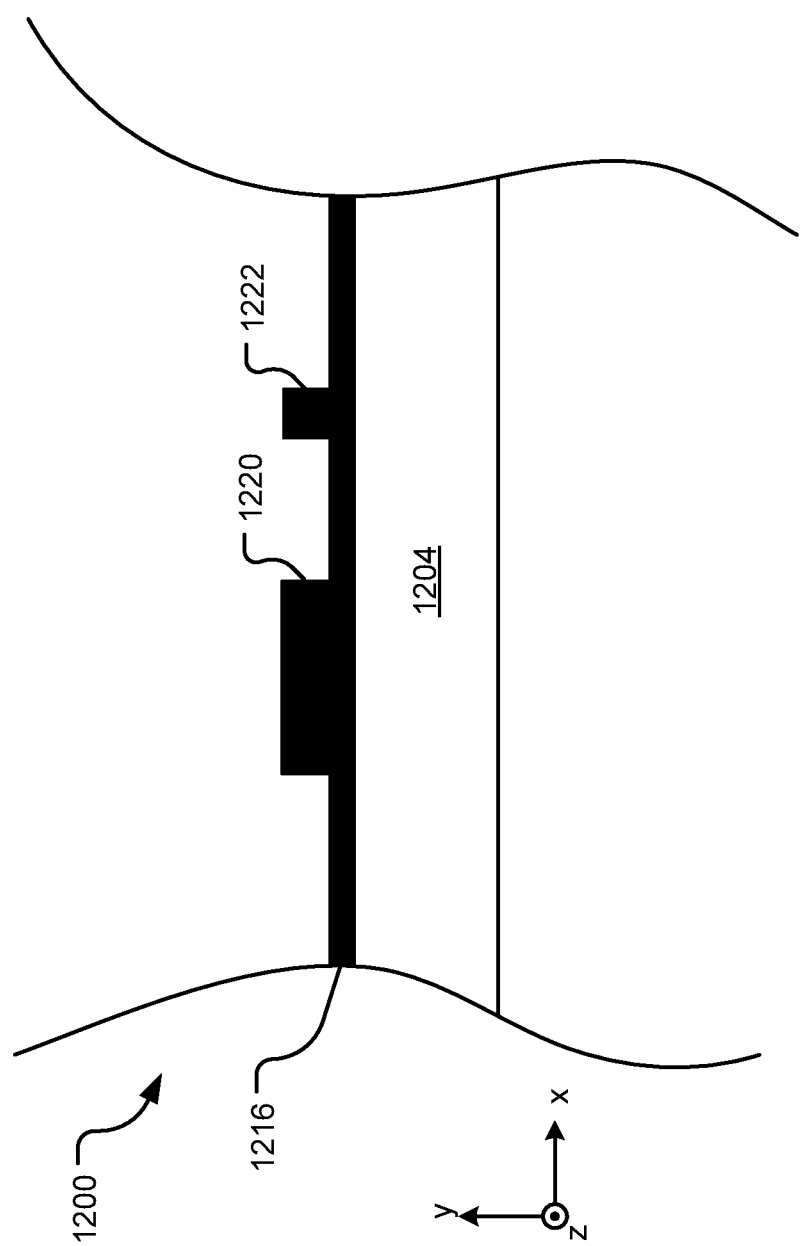
FIG. 12 illustrates an elevation view of a patterned microelectronic structure using nanoimprint lithography.

FIG. 12 illustrates an elevation view of a patterned microelectronic structure 1200 using nanoimprint lithography. The patterned microelectronic structure 1200 is a high resolution inverse copy of a template pattern (e.g., template 1118 pattern of FIG. 11) in photoresist 1216 on a substrate 1204. The patterned microelectronic structure 1200 includes high resolution features 1220, 1222 that correspond to the template used to form the patterned microelectronic structure 1200.

Figure 13:
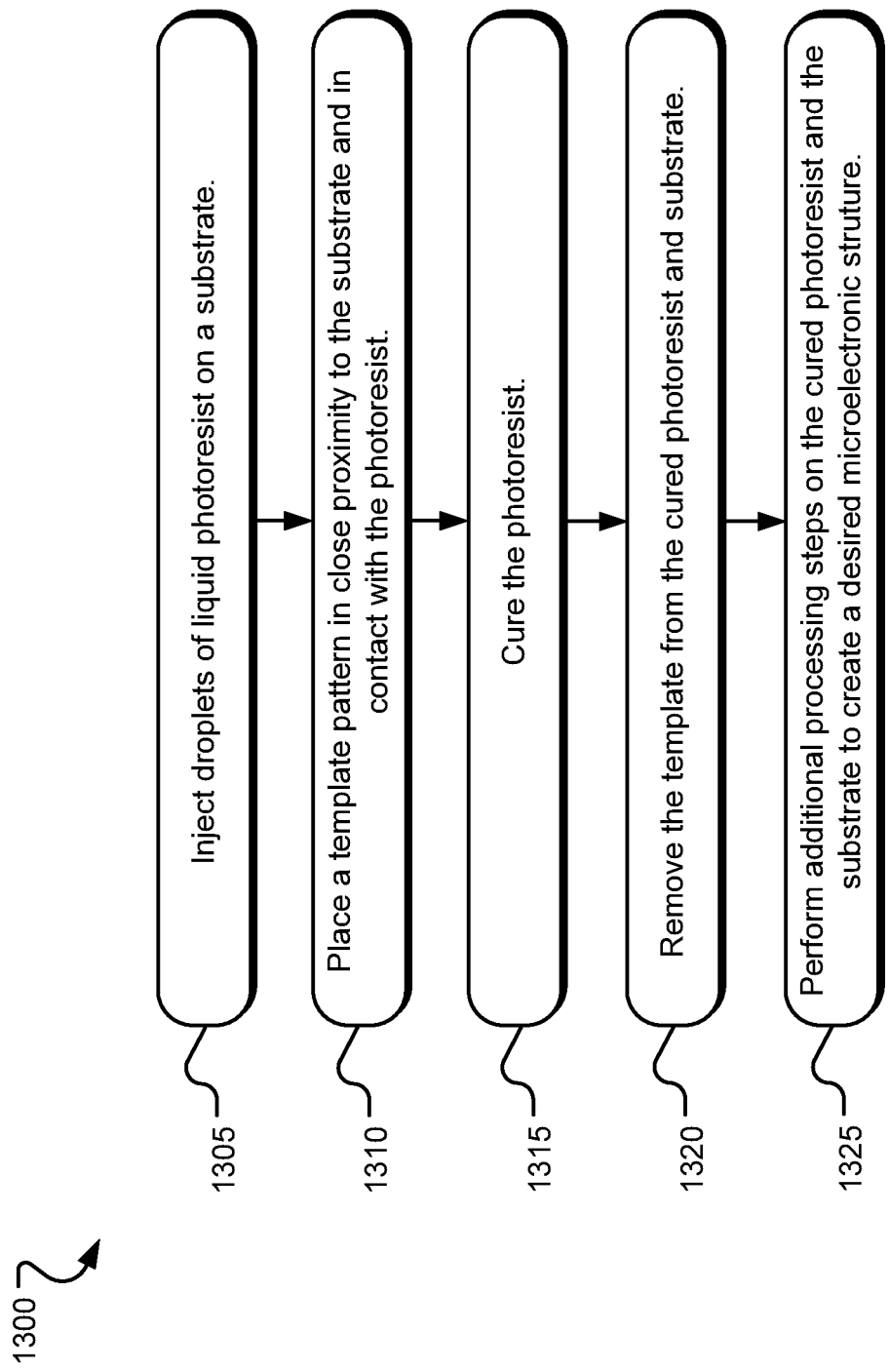
FIG. 13 illustrates example operations for patterning a microelectronic structure onto a substrate using nanoimprint lithography.

FIG. 13 illustrates example operations 1300 for patterning a microelectronic structure onto a substrate using nanoimprint lithography. An injecting operation 1305 injects droplets of liquid photoresist on the substrate. The substrate is a ceramic wafer (e.g., an AlTiC wafer). The droplets of photoresist are injected onto the substrate in an array of droplets. Further, the droplets may be concentrated specifically where there are structures to be patterned onto the substrate.

A placing operation 1310 places a template pattern in close proximity to the substrate and in contact with the photoresist. The template includes features to be reproduced onto the substrate. Each of the features has particular dimensions (e.g., height, width, and length that correspond to the dimensions of a feature to be reproduced onto the substrate. Further, the template may be actively aligned with the substrate via alignment marks as it is moved in close proximity to the substrate. The liquid resist occupies features of the template pattern to be reproduced onto the substrate. Mechanical deformation and capillary action allows the liquid resist to fully occupy the template pattern between the template and the substrate.

A curing operation 1315 cures the photoresist into a solid state. The imprint resist is cured by heat or UV light. The curing heat/light solidifies the resist in the shape of the template pattern on the substrate. A removing operation 1320 removes the template from the cured photoresist and substrate. The template separates from the cured photoresist layer while the photoresist layer remains attached to the substrate. This is accomplished by selecting the material and surface properties of the template and substrate so that the template has less adhesion to the photoresist layer than the substrate. In some implementations, a coating on the template promotes separation of the template from the photoresist layer. A resulting patterned microelectronic structure is a high-resolution inverse copy of a template pattern in solid photoresist on the substrate.

A performing operation 1325 performs additional processing steps on the cured photoresist and substrate to create a desired microelectronic structure (e.g., write pole, a reader, and a near-field transducer). These additional operations may include additional lithography operation, lapping, polishing, ashing, etching, deposition, ion beam milling, etc. The end result is a microelectronic structure with a desired resolution, symmetry, and/or pattern fidelity.

Further, the operations 1300 may be performed to manufacture a single microelectronic structure onto a substrate (see e.g., FIGS. 1-7) or many microelectronic structures onto the substrate simultaneously (see e.g., FIG. 8). For example, thin film heads are manufactured in grouping referred to as bars containing a predetermined number of thin film heads (e.g., 50-100 heads, often 64 heads) in a row. The entire bar of thin film heads may be patterned simultaneously using operations 1300, without the need to stitch together individual thin film heads using a step-and-repeat process such as that often used in optical lithography. As a result, colinearity errors within a manufactured bar of thin film heads are minimized (e.g., maintained at less than about 2 nm error) or eliminated by the simultaneous patterning of the entire bar using operations 1300.

In some implementations, the nanoimprint lithography operations 1300 are performed to pattern critical geometry features of a substrate, while optical lithography is used to pattern non-critical geometry features of a substrate. In some implementations, the critical geometry features of the substrate only occupy about 1% of the total substrate area. Further, patterning a thin film microelectronic structure onto a substrate may involve many lithography operations to layer and pattern the structure. These lithography operations may involve one or more steps of optical lithography, nanoimprint lithography, and e-beam lithography. For example, 3 of 15 lithography steps may involve nanoimprint lithography in patterning a thin film head. Still further, alignment of the multiple lithography layers may be important. In one implementation, alignment between adjacent layers is maintained at less than about 12 nm error.

The logical operations making up the embodiments of the invention described herein are referred to variously as operations, steps, objects, or modules. Furthermore, it should be understood that logical operations may be performed in any order, adding and/or omitting operations as desired, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A magnetic thin film head comprising:
one or more microelectronic structures patterned using nanoimprint lithography, wherein the one or more microelectronic structures include a near-field transducer for a magnetic storage drive and wherein one or more critical geometry features are patterned using nanoimprint lithography and one or more non-critical geometry features are patterned using optical lithography.

2. The magnetic thin film head of claim 1, wherein each microelectronic structure has one or more corners with a radius of curvature less than about 100 nm and an edge placement error less than about 5 nm.

3. The magnetic thin film head of claim 1, wherein each microelectronic structure has a critical dimension less than about 20 nm.

4. The magnetic thin film head of claim 1, wherein each microelectronic structure has line edge roughness of less than about 3 nm.

5. The magnetic thin film head of claim 1, wherein symmetry about a central axis of each microelectronic structure is maintained at less than about 5 nm error.

6. The magnetic thin film head of claim 1, wherein areas surrounding the microelectronic structures within a common layer are patterned using optical lithography.

7. The magnetic thin film head of claim 1, wherein at least two of the microelectronic structures are stacked in separate thin film layers and alignment of the at least two stacked microelectronic structures is maintained at less than about 12 nm error.

8. The magnetic thin film head of claim 1, wherein the one or more microelectronic structures are patterned over one or more magnetic structures.

9. A method comprising:
patterning a thin film head having one or more microelectronic structures having critical geometry features using nanoimprint lithography, wherein the one or more microelectronic structures include a near-field transducer for a magnetic storage drive, and wherein the patterning operation includes:
injecting droplets of liquid photoresist on a substrate;
placing a template pattern in close proximity to the substrate and in contact with the liquid photoresist;
curing the photoresist;
removing the template pattern from the cured photoresist and the substrate; and
patterning areas surrounding the one or more microelectronic structures having non-critical geometry features within a common layer using optical lithography.

10. The method of claim 9, wherein the patterning operation is performed over one or more magnetic structures.

11. The method of claim 9, further comprising patterning one or more layers of the microelectronic structures using nanoimprint lithography and patterning one or more additional layers of the one or more microelectronic structures using optical lithography.

12. The method of claim 9, further comprising performing processing steps on the cured photoresist and substrate to create desired characteristics in the one or more microelectronic structures.

13. The method of claim 12, wherein the processing steps include at least one of lithography, lapping, polishing, ashing, etching, deposition, and ion beam milling.

14. The method of claim 12, wherein the desired characteristics of the one or more microelectronic structures includes at least one or resolution, symmetry, and pattern fidelity.

15. A bar of two or more thin film heads comprising:
one or more microelectronic structures having critical geometry features on each of the two or more thin film heads patterned using nanoimprint lithography, wherein the one or more microelectronic structures includes a near-field transducer for a magnetic storage drive wherein areas surrounding the one or more microelectronic structures within a common layer having non-critical geometry features are patterned using optical lithography.

16. The bar of two or more thin film heads of claim 15, wherein critical dimension uniformity of each of the two or more thin heads across the bar of thin film heads varies by less than about 4 nm.

17. The bar of two or more thin film heads of claim 15, wherein spacing of each of the two or more thin film heads across the bar of thin film heads varies by less than about 5 nm.

18. The bar of two or more thin film heads of claim 15, wherein each microelectronic structure has a critical dimension less than about 20 nm.

19. The bar of two or more thin film heads of claim 15, wherein a colinearity error between each of the two or thin more film heads across the bar of thin film heads varies by less than about 5 nm.

* * * * *